May 29, 1951  D. D. SHIELDS ET AL  2,555,061
ALIGNED ROTARY ELEMENTS WITH OVERLOAD RELEASE
Filed Nov. 21, 1947  2 Sheets-Sheet 1

Inventors
Darvin D. Shields
Elvie E. Jeffcoat

By Clarence A. O'Brien
and Harvey B. Jacobson
Attorneys

May 29, 1951  D. D. SHIELDS ET AL  2,555,061
ALIGNED ROTARY ELEMENTS WITH OVERLOAD RELEASE
Filed Nov. 21, 1947  2 Sheets-Sheet 2

Inventors
Darvin D. Shields
Elvie E. Jeffcoat

By Clarence A. O'Brien
and Harvey B. Jacobson
Attorneys

Patented May 29, 1951

2,555,061

UNITED STATES PATENT OFFICE 2,555,061

ALIGNED ROTARY ELEMENTS WITH OVERLOAD RELEASE

Darvin D. Shields and Elvie E. Jeffcoat, Aransas Pass, Tex.

Application November 21, 1947, Serial No. 787,360

1 Claim. (Cl. 64—28)

This invention relates generally to axle assemblies, and more particularly to an axle assembly suitable for use in heavy duty trucks and the like, and in which the torque is transmitted through a shear pin.

A primary object of this invention is to prevent the breakage of axles, the pin being adapted to shear before a strain sufficient to break the axle is transmitted thereto.

Another object of this invention is to provide means whereby an axle assembly incapacitated by the shearing of the pin may be quickly restored into operative condition, without the use of special tools, and without the necessity of application of any great degree of mechanical skill.

Still another object of this invention is to lessen the cost of upkeep of trucks and similar devices, since the cost of replacing a shear pin is negligible in comparison with the cost of replacing a broken axle.

Another object of this invention is to provide means of the character mentioned above which will allow visual inspection, upon removal of a hub cap in some instances, to determine whether or not the shear pin is in condition.

And a last object to be specifically mentioned is to provide a device of this character which is relatively inexpensive and practicable to manufacture, having reference to the parts per se incorporated with the axle according to this invention, which is extremely simple and safe to use, and which will give generally efficient and durable service.

With these objects definitely in view, together with other objects inherent in the structure of this device which will become apparent as this description proceeds, this invention resides in certain novel features of construction, combination and arrangement of parts and portions, as will be described in detail in the specification, particularly pointed out in the appended claim, and illustrated in the accompanying drawings which form a material part of this application, and in which:

Similar characters of reference designate similar or identical parts and portions throughout the specification and throughout the several views of the drawings.

Figure 1:
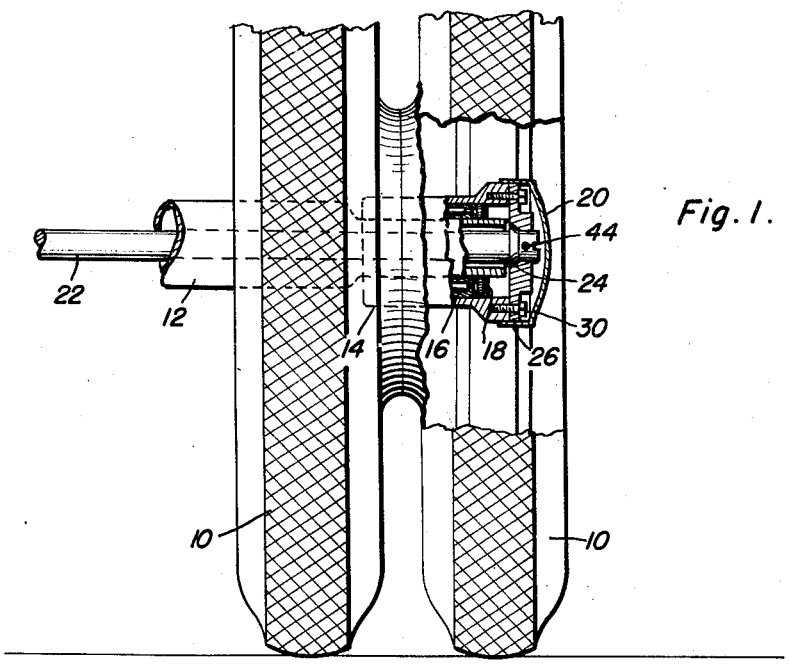
Figure 1 is a fragmentary view of a dual wheel construction for a truck with this invention incorporated thereon, portions being broken away and the underlying portions being shown in vertical section and in elevation to facilitate the illustration of this invention and to amplify the disclosure thereof.
Figure 2:
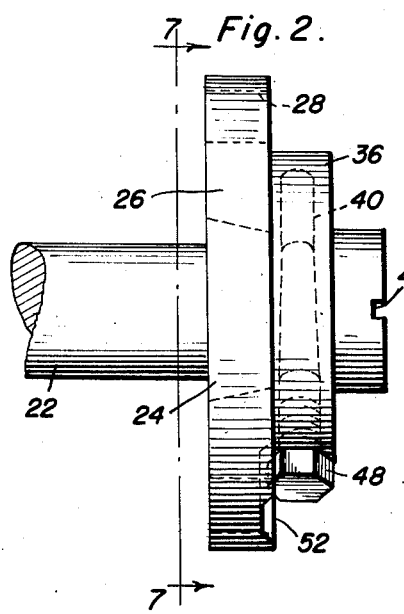
Figure 2 is a side elevational view of a portion of an axle having this invention incorporated therewith.
Figure 3:
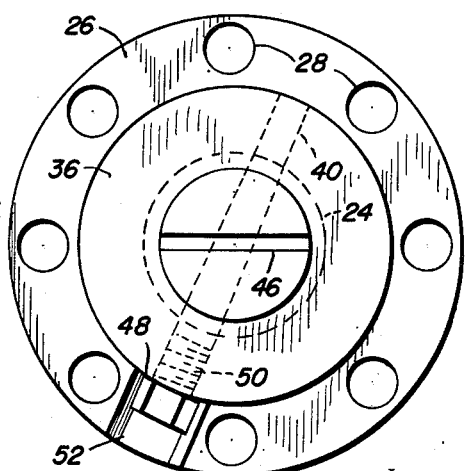
Figure 3 is an end elevational view of the structure illustrated in Figure 2.
Figure 4:
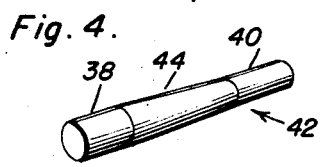
Figure 4 is a perspective view of the shear pin.
Figure 5:
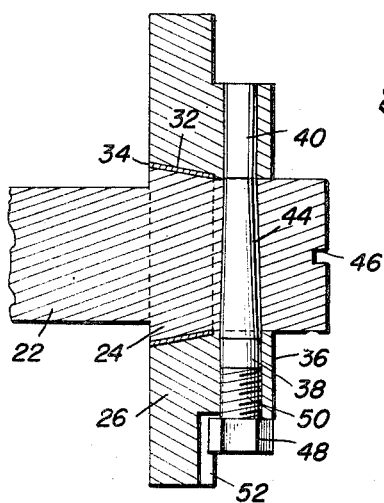
Figure 5 is a vertical cross-sectional view, taken on a vertical section line through the center of Figure 3.
Figure 6:
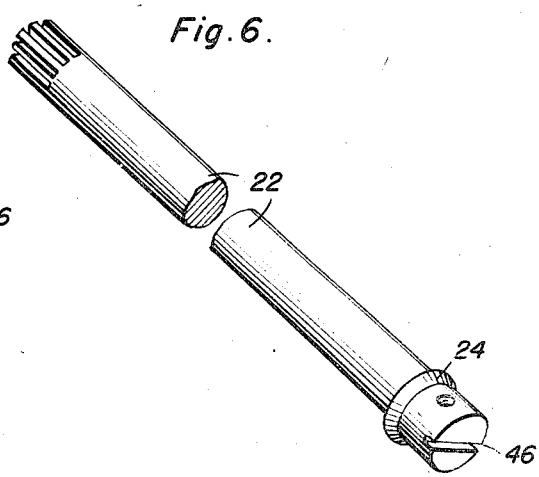
Figure 6 is a broken perspective view of an axle constructed according to this invention.
Figure 7:
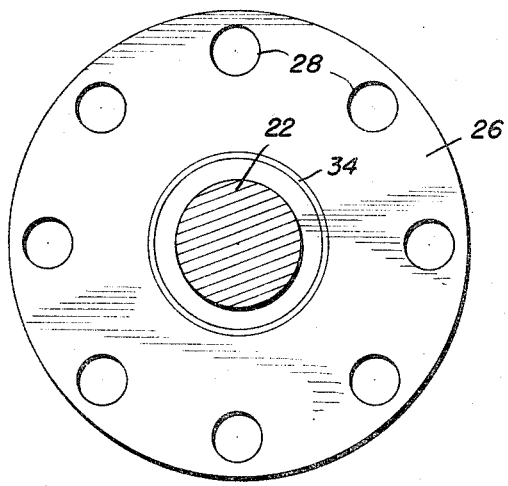
Figure 7 is an end view of the structure illustrated in Figure 5, the view being taken as from the left hand side of Figure 5; and, Figure 8 is a perspective view of the gasket used in this invention.
Figure 8:
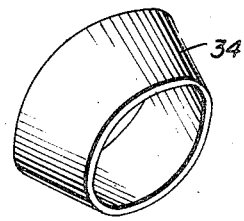

Referring now to the drawings in detail, it will be noted that this invention is adapted to be used with an environment including a vehicle having ground contacting wheels, represented by the dual wheels illustrated in part in Figure 1, which will ordinarily be rubber tired as indicated at 10.

In Figure 1, an axle housing 12 is associated with a hub 14, a complement of bearings 16, oil seal 18 and hub cap 20 benig provided. As is usual in such constructions, the axle 22 is relied upon to transmit the torque to the wheel assembly, and in this invention the axle 22 is provided with an integral flaring shoulder 24 which is spaced a short distance from the outer end of the axle. An end plate 26 having holes 28 to receive the hub attaching studs 30, is provided with an axial aperture to receive the outer end of the axle 22, and this axial aperture has a flaring portion 32 adapted to receive the flaring shoulder 24 on the axle. A gasket of hollow frusto-conical shape, indicated at 34, is compressed between the flaring shoulder 24 and the flaring portion 32 to provide a grease seal.

The end plate 26 is formed with an integral extending portion 36 on what may be considered the outer side thereof and this extending portion is diametrically bored, the bores on opposite sides being aligned but of slightly different diameter, to receive the non-tapered portions 38 and 40 of the shear pin generally indicated by the numeral 42. The portion of the shear pin 42 between the non-tapered portions is regularly tapered as indicated at 44 and this tapered portion of the shear pin is received in a tapered bore diametrically disposed in the axle 22.

The end of the axle is preferably slotted as at 46 to facilitate the rotation of the axle in order to align the bores in the extending portion 36 of the end plate with the tapered bore in the axle, as in inserting the shear pin 42. A set screw 48 is used to force the shear pin into place and to hold the same in operative position, this set screw having the threaded shank portion thereof 50 threadedly associated with the threaded outer end portion of the larger bore provided in the extending portion 36 of the end plate. To facilitate the insertion of this set screw 48, and to allow for a relatively larger head construction for this screw without making the assembly bulky, the end plate is preferably recessed radially, as at 52.

The operation of this invention will be clearly understood from the foregoing description of the mechanical details thereof, taken in connection with the above description of the objects sought to be achieved by this invention. In recapitulation, it need only be added that the above construction provides adequate sealing against leakage of oil and grease, while simplifying the securement of a hub to an axle. A further advantage will now be more clearly evident in the light of the foregoing disclosure namely, the avoidance of the necessity of removing the studs 30, except when it becomes necessary to remove the hub assembly, such removal being completely unnecessary in order to replace a sheared pin 42. It will also be clear that all of the objects recited above have been amply and fully attained by this invention.

Minor variations may be made in the exact construction and proportionment of various parts of this invention, all without departure from the spirit and scope thereof, and this invention should be limited only by a proper interpretation of the terms used in the appended claim.

Having described the invention what is claimed as new is:

An axle assembly including an axle shaft having a shoulder, an end plate having an aperture to receive said axle and shoulder in sealed relationship, said axle and said end plate having alignable diametrically disposed bores, and a shear pin extending through said bores, said axle bore and a portion of said pin being tapered, one end of the bore in said end plate being screw threaded, and a set screw secured in said threaded end in engagement with the larger end of said pin.

DARVIN D. SHIELDS.
ELVIE E. JEFFCOAT.

REFERENCES CITED

The following references are of record in the file of this patent:

FOREIGN PATENTS

| Number | Country | Date |
|--------|---------|------|
| 195,524 | Great Britain | 1923 |